United States Patent [19]

Gazzarrini

[11] Patent Number: 4,953,687

[45] Date of Patent: Sep. 4, 1990

[54] METHOD AND APPARATUS FOR AUTOMATICALLY TRANSFERRING AND ACCUMULATING GROUPS OF FLACCID ARTICLES

[75] Inventor: Vinicio Gazzarrini, Firenze, Italy

[73] Assignee: Solis S.R.L., Firenze, Italy

[21] Appl. No.: 247,709

[22] Filed: Sep. 22, 1988

[30] Foreign Application Priority Data

Sep. 22, 1987 [IT] Italy .................... 9491 A/87

[51] Int. Cl.⁵ .............................................. B65G 25/00
[52] U.S. Cl. ................................... 198/347.1; 198/370;
  198/775; 271/175; 112/121.15; 112/121.29;
                          112/304; 414/790; 414/790.1
[58] Field of Search .................. 414/790, 790.1, 790.9,
     414/791, 791.1, 794.4; 198/775, 347, 370–371,
       463.6; 271/256, 270, 175; 112/121.15, 121.29,
                                         304, 312

[56] References Cited

U.S. PATENT DOCUMENTS

| | | |
|---|---|---|
| 3,433,187 | 3/1909 | Haefele . |
| 3,915,316 | 10/1975 | Pomara, Jr. ............... 414/794.4 X |
| 3,934,707 | 1/1976 | Bowman . |
| 3,973,665 | 8/1976 | Giammanco ................... 198/775 |
| 4,040,512 | 8/1977 | Ness .......................... 198/463.3 X |
| 4,051,957 | 10/1977 | Parups ........................ 414/791.1 |
| 4,280,614 | 7/1981 | Balch et al. .................. 271/270 |
| 4,405,186 | 9/1983 | Sandberg et al. ............ 414/790 X |
| 4,428,315 | 1/1984 | Keeton ....................... 112/262.3 |
| 4,534,695 | 8/1985 | Stump et al. ............... 198/775 X |
| 4,558,984 | 12/1985 | Garrett ...................... 198/775 X |
| 4,598,814 | 7/1986 | Felder . |
| 4,599,025 | 7/1986 | Borsuk et al. ............. 414/790.9 X |
| 4,624,615 | 11/1986 | Russell et al. .............. 271/175 |
| 4,635,574 | 1/1987 | Fujita et al. . |
| 4,643,629 | 2/1987 | Takahashi et al. .......... 198/347 X |
| 4,658,947 | 4/1987 | Welder ...................... 198/463.3 X |
| 4,693,460 | 9/1987 | Adamson et al. ........... 271/227 X |
| 4,708,334 | 11/1987 | Flavell et al. ................ 271/189 X |
| 4,711,342 | 12/1987 | Abraham .................... 198/775 X |
| 4,765,452 | 8/1988 | Johansson .................. 198/463.6 X |
| 4,778,438 | 10/1988 | Tastauin et al. ............ 271/175 X |
| 4,780,043 | 10/1988 | Fenner et al. .............. 198/463.3 X |

FOREIGN PATENT DOCUMENTS

| | | |
|---|---|---|
| 417356 | 9/1935 | Belgium . |
| 408505 | 5/1954 | Belgium . |
| 57055 | 4/1985 | European Pat. Off. . |
| 136391 | 4/1987 | European Pat. Off. . |
| 0136391 | 4/1987 | European Pat. Off. . |
| 2366395 | 4/1978 | France . |
| 1092073 | 6/1985 | United Kingdom . |
| 2187156 | 9/1987 | United Kingdom . |

Primary Examiner—Joseph J. Rolla
Assistant Examiner—Boris Milef
Attorney, Agent, or Firm—Shefte, Pinckney & Sawyer

[57] ABSTRACT

An apparatus for transferring groups of pantyhose from loading stations to an unloading station with intermediate accumulating stations inbetween. An endless conveyor belt advances the pantyhose groups from either of the unloading stations to the next empty intermediate accumulating station, from one intermediate accumulating station to the next, and from an adjacent intermediate accumulating station to the unloading station. The belt operates in either direction depending on location of the station from which the pantyhose groups are to be advanced with respect to the unloading station. The conveyor belt is formed of a plurality of spaced elements and the platform is formed of spaced strips provided for extension through the spaces in the belt to support and retain pantyhose groups at a station while the belt advances pantyhose groups between other stations. The platform is retractable through the belt to place the pantyhose group on the belt for advancing from the station to the next station.

15 Claims, 3 Drawing Sheets

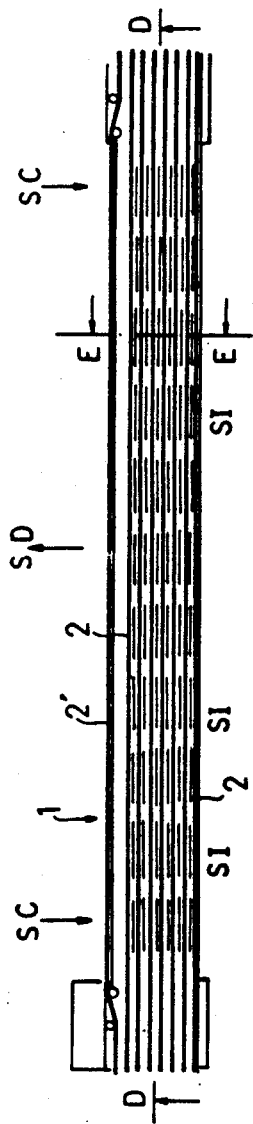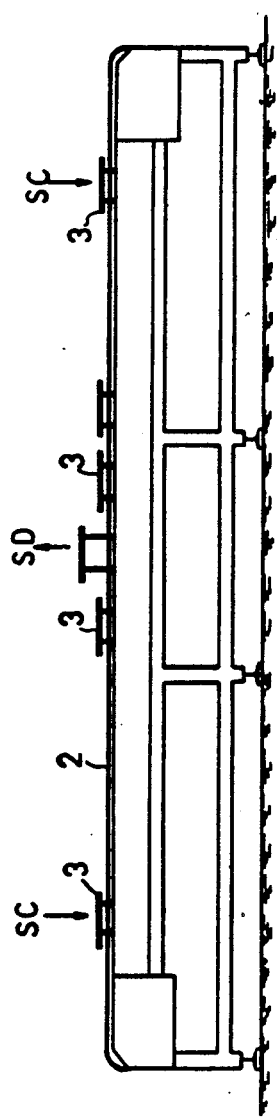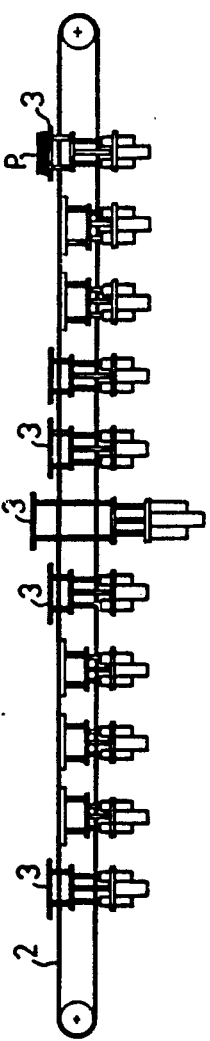

METHOD AND APPARATUS FOR AUTOMATICALLY TRANSFERRING AND ACCUMULATING GROUPS OF FLACCID ARTICLES

BACKGROUND OF THE INVENTION

The present invention relates to a method and apparatus for automatically transferring and accumulating groups of flaccid articles, and more particularly to a method and apparatus for automatically transferring and accumulating groups of flaccid articles, such as pantyhose or other hosiery or similar articles, between loading and unloading stations and to and from intermediate accumulating stations.

There are several known devices for the automatic transfer of pantyhose of similar tubular articles from one processing machine to another. For example, Patent BE 070,813 discloses a device for the transfer of pantyhose from an automatic sewing machine that initially forms the pantyhose to a sewing machine that inserts gussets. Patent BE 136,391 discloses a device for the transfer of pantyhose from a sewing machine that initially forms the pantyhose to a toe-closing machine, as well as a device for the transfer of pantyhose from a toe-closing machine to a gusset sewing machine. Patent BE 057,055 and Patent IT 9434-A/87 disclose devices for the transfer of pantyhose from a toe-closing machine to a machine for further processing.

A problem common to most of these prior devices is that the transfer from machine to machine is direct, such that when one of the machines is stopped temporarily, as occurs periodically for various reasons, the other machine must be stopped also due to the direct linkage of the transfer of articles by the transferring device. In this regard, the prior devices are not adaptable to transferring articles between machines having different production rates; therefore, the production rate of the machine capable of faster production must be slowed to that of the slower operating machine. Further, the prior devices are not adaptable to transferring between different numbers of machines, such as from one machine to two machines or vice versa. These disadvantages have an adverse effect on the efficiency of the production of the overall system, which is obviously undesirable in present day manufacturing.

SUMMARY OF THE INVENTION

The present invention overcomes the disadvantages of the prior devices by providing a method and apparatus that transfers articles in a manner that provides for temporary accumulation so that the machines between which a transfer takes place are not directly linked whereby temporary storage or slowdown of one machine does not require stoppage or slowdown of the other machine, and articles can be transferred effectively between different number of machines having different production rates.

Briefly described, the method of the present invention provides for automatically transferring and accumulating groups of flaccid articles such as pantyhose of other hosiery or similar articles between loading and unloading stations and to and from intermediate accumulating stations. The method includes loading articles at a loading station to provide a group of articles thereat, unloading articles at an unloading station independent of the loading, advancing the group of articles from the loading station toward the unloading station to an intermediate accumulating station having no group of articles thereat while retaining any articles that are at an unloading station and retaining any group of articles that are at other intermediate accumulating stations, and advancing a group of articles from an intermediate accumulating station to the unloading station. The advancing from the loading station is performed upon completion of loading of a group of articles thereat and the advancing from an intermediate accumulating station to the unloading station is performed upon unloading of all articles at the unloading station.

Preferably, the method also includes advancing a group of articles from one intermediate accumulating station to another intermediate accumulating station more proximate the unloading station, which is performed during either or both the advancing of articles from a loading station or the advancing of articles to an unloading station.

The invention is adaptable to use of a pair of loading stations and one unloading station between the loading stations, with the method being performed so that during each advancing any group of articles at an intermediate accumulating station on the opposite side of the unloading station from the advancing is retained at its respective station. Of course, the method can function in the same way with a pair of unloading stations and one loading station between the unloading stations.

In the preferred embodiment, the method is practiced using an endless conveyor belt extending between all stations and on which groups of articles are placed for movement thereon in the direction of advancing. The retaining of articles at stations from advancing of other articles on the conveyor belt is performed by raising articles out of contact with the conveyor belt.

The method may be practiced by forming the loading by loading articles individually to form a group of articles and by unloading articles individually. In doing this, prior to completion of each loading or unloading, an intermediate accumulating station is selected for the respective advancing, and advancing to the unloading station is given precedence over advancing from the loading station.

The preferred embodiment of the present invention is particularly adaptable to transferring of articles that are positioned during transferring with portions hanging freely. In doing this, when the articles are raised for retention they are also moved laterally to position the freely hanging portions thereof out of contact with the conveyor belt.

The apparatus of the present invention includes a loading station, an unloading station, intermediate accumulating stations between the loading and unloading stations, means for advancing groups of articles from the loading station to intermediate accumulating stations having no articles thereat, from an intermediate accumulating station to another intermediate accumulating staton having no articles thereat, and from an intermediate accumulating station to the unloading station, and means at each loading, unloading, and intermediate accumulating station for selectively supporting and retaining articles thereat during operation of the advancing means. The advancing means is preferably operable to advance a group of articles from one intermediate accumulating station to another intermediate accumulating station more proximate the unloading station. In the preferred embodiment, the stations are equally spaced and the advancing means is operable to advance groups of articles to at least two stations simultaneously. Also preferably, there is a pair of loading stations with one unloading station therebetween with the supporting and retaining means being operable to retain articles at intermediate accumulating stations on one side of the unloading station while the advancing means is advancing articles on the other side of the unloading station. Alternatively, there can be two unloading stations with the loading station therebetween.

In the preferred embodiment, the advancing means includes an endless conveyor belt extending between all stations for transferring groups of articles thereon, and in an arrangement where there are two stations of one type with a station of the other type therebetween the belt is movable in opposite directions for advancing article groups in either direction toward an unloading station. With the use of a conveyor belt, the supporting and retaining means is preferably operable to raise the articles at the station to positions out of contact with the conveyor belt.

The apparatus is capable of operation with the article supporting and retaining means disposed for supporting articles with portions hanging freely therefrom and operable to move the freely hanging article portions laterally during raising of the articles to position the freely hanging portions thereof out of contact with the conveyor belt.

In the preferred embodiment, the conveyor belt includes longitudinally extending spaces for movement therethrough of the supporting and retaining means between retracted position out of supporting and retaining engagement of articles and extended position supporting and retaining articles out of contact with the belt. In this form the conveyor belt preferably is formed of a plurality of longitudinally extending, laterally spaced strips, and the supporting and retaining means comprises a platform formed of a plurality of longitudinally, laterally spaced elements aligned with the spaces in the belt and movable therethrough between the belt strips. The laterally outermost belt strip may be arranged with an upper reach outwardly offset from its lower reach for support and advancing of articles having portions hanging freely out of contact with the lower reach.

In the preferred embodiment, the supporting and retaining means includes an element extendable to a position laterally offset from and above the advancing means to support portions of articles in freely hanging disposition out of contact with the advancing means and retractable out of contact with the articles for free hanging of the article portions from the advancing means. With the embodiment including a conveyor belt, this element is extendable to a position laterally offset from and above the conveyor belt and retractable to within the lateral extent of the conveyor belt. For example, with the form of belt described above having an offset upper reach, the extendable element is retractable within the lateral extent of the reach of the belt.

In one embodiment of the loading station, the loading station includes an element extendable to a position laterally offset from and above the advancing means or belt to receive and support articles with portions hanging freely therefrom out of contact with the advancing means, and a plate member is positionable in a generally upright disposition above the advancing means for receiving articles extending from the extendable element over the plate member. The extendable element is retractable and the plate member is movable to a generally horizontal disposition laterally beyond the advancing means or belt in the direction opposite the lateral disposition of the extendable element and withdrawn from under the articles to place the articles onto the advancing means with the hanging portions hanging freely from the advancing means.

The plate member may be formed with an upper edge and a lower edge when in its generally upright position. The upper edge may be pivotally connected to a pivot arm, the other end of which pivot arm is mounted at a fixed pivot above the upright position of the plate member and offset laterally therefrom in a direction opposite the laterally offset position of the extendable element. Means are provided for manipulating the plate member to move its lower edge in this opposite lateral direction to cause pivoting of the upper edge downwardly to dispose the plate member generally horizontal for horizontal support of the articles and to move laterally from under the articles for placement of the articles onto the advancing means. In a specific embodiment for the manipulating means includes a generally horizontally disposed piston-cylinder mechanism having the outer end of the piston connected to the lower edge of the plate member and extendable to move the lower edge in the opposite lateral direction.

In an alternate embodiment of the apparatus of the present invention, the loading, unloading and intermediate accumulating stations are formed on an article supporting table that supports and retains articles at the stations. The table is formed at each station with a plurality of parallel spaced elements extending laterally at an edge thereof, and the advancing means includes a plurality of parallel spaced strips movable into alignment with the spaces between the spaced elements from a retracted position below the table out of contact with articles at the stations, upwardly through the spaces at a station to raise the articles from the table for advancing to another station, and downwardly through spaces at another station for placing the articles to be supported at the station. In the preferred form of this embodiment, the stations are arranged for support of articles with portions of the articles hanging freely from an edge of the table opposite the edge at which the elements extend, and the advancing means is movable to move the strips laterally at least partially beyond the opposite edge to support and advance the articles with the hanging portions out of contact with the table.

In one embodiment of this form of the apparatus, the table is annular, having an inner circular edge at which the elements extend, and the advancing means includes a generally horizontally extending arm from which the strips extend, with the arm being movable vertically to move the strips through the spaces and being rotatable about an axis centrally of the table to advance the articles supported on the strips from one station to another. The arm may also be extendable radially for movement of the strips laterally to support the articles with hanging portions out of contact with the table during advancing.

In a modification of this table embodiment, the table extends linearly with the stations in general alignment. In this form the table has one edge at which elements at all stations extend, and the advancing means includes a generally horizontally extending arm extending laterally with respect to the table and from which the strips extend. The arm is movable vertically through the spaces of the table and movable linearly with respect to the table to advance articles from one station to another.

In the form where articles are supported with portions hanging freely, the arm is extendable laterally for movement of the strips laterally to support the articles with their hanging portions out of contact with the table during advancing.

Thus, the present invention provides for the transfer of articles between one or more processing machines of a first type to one or more processing machines of a second type, while maintaining the independent functioning of each machine and providing a temporary accumulation of articles so that if one or more machines of either type is temporarily stopped or slowed down, the other machines can continue in operation.

The invention is also adaptable to automatic controlling through a microprocessor or other programmable controller that can receive information regarding the number of articles at all the stations and control advancing from one station to a selected other station and the selective retaining of articles at stations.

Other and further features and advantages of the present invention will be apparent from the accompanying drawings and the following detailed description of the preferred embodiments.

BRIEF DESCRIPTION OF THE DRAWINGS

FIG. 1 is a schematic plan view of an apparatus for transferring articles according to a first preferred embodiment of the present invention;

FIG. 2 is a side-elevational view of the apparatus of FIG. 1;

FIG. 3 is a vertical longitudinal sectional view taken along line D—D of FIG. 1;

DETAILED DESCRIPTION OF THE PREFERRED EMBODIMENTS

Referring first to FIGS. 1-5, a preferred embodiment of the apparatus for automatically transferring and accumulating groups of flaccid articles is illustrated in a form for handling pantyhose P that have been initially processed on a sewing machine, such as a "Takatori III" type, to a toe-closing machine, such as a "SOLIS IV" type. The apparatus includes articles advancing means in the form of an endless belt 1 formed of a plurality of longitudinally extending, laterally spaced strips 2 movable linearly and intermittently in opposite directions. The belt 1 has an upper reach extending generally horizontally for receipt and transfer of groups of pantyhose P from two loading stations SC at the ends of the belt 1. These loading stations SC are located in relation to the pantyhose sewing machines for loading of pantyhose P at the loading stations from the machines. An unloading station SD is provided at the center of the conveyor belt 1 between the two loading stations SC and in relation to a toe-closing machine for unloading of the pantyhose P from the unloading station SD onto the machine. Between each loading station and the unloading station there are a plurality of intermediate accumulating stations SI equally spaced along the length of the conveyor. These intermediate accumulating stations SI provide for temporary accumulation of the groups of pantyhose P.

Means 3 is provided at each station for supporting and retaining pantyhose P thereat during advancing of other pantyhose from, to and between other stations. This supporting and retaining means is in the form of a horizontal platform 3 on which a plurality of pantyhose P are stacked to form a group with the leg portions of the pantyhose P hanging freely from one side of the platform 3. The platform 3 is formed of a plurality of longitudinally extending, laterally spaced elements aligned with the spaces in the belt 2 and movable therethrough between the belt strips in a vertical reciprocation between a retracted position below the upper reach of the belt 2 and an extended position above the belt and supporting the pantyhose P out of contact with the belt. The vertical reciprocation of each platform 3 is accomplished by a pneumatic-cylinder mechanism below each platform.

When this pneumatic-cylinder is operated to lower the platform 3, the platform 3 is below the belt 2 so that pantyhose P on the belt at the particular station at which the platform is lowered will be supported on the belt and will be advanced toward the unloading station SD with the belt moving in either direction, depending on the location of the station with respect to the unloading station SD. The platform 3 at the unloading station SD is, of course, programmed so that it remains raised whenever there are pantyhose on the platform and it is lowered to allow a new group of pantyhose to be advanced to the station.

Figure 4:
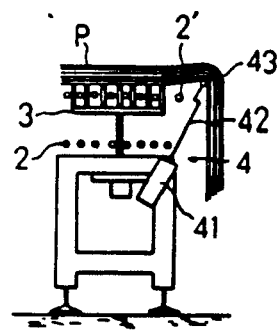
FIG. 4 is a vertical transverse sectional view taken along line E—E of FIG. 1.
Figure 5:
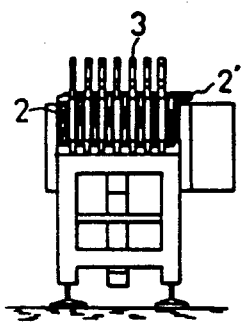
FIG. 5 is an end elevational view of the apparatus of FIG. 1 as viewed from the right in FIG. 1.

As seen in FIGS. 1, 4 and 5, the belt 2 includes an outermost strip having an upper reach 2' outwardly offset from the lower reach for support and advancing of pantyhose P with the leg portions of the pantyhose P hanging freely out of contact with the lower reach.

The supporting and retaining means includes a mechanism 4 for supporting the freely hanging leg portions of the pantyhose P outwardly away from the belt 2 when the platform 3 is in its raised, pantyhose supporting position. This mechanism 4 includes an element in the form of a rod 43 extendable to a position laterally offset from and above the belt 2 and the offset upper reach 2' of the outermost srip to support the leg portions of the pantyhose P in freely hanging disposition out of contact with the belt. The rod 43 is connected to the outer end of a piston rod 42 operated by a pneumatic cylinder 41 to extend to the operable position shown in FIG. 4 and retractable out of contact with the pantyhose for free hanging of the leg portions from the conveyor belt during advancing. The cylinder 41 and piston rod 42 are mounted on the apparatus at an inclination of about 30° from the vertical so that upon retraction the rod 43 will be withdrawn within the lateral extent of the upper reach 2' of the outermost belt strip.

To facilitate this, the piston rod 42 is illustrated to have an offset intermediate its ends, as seen in FIG. 4.

Figure 6:
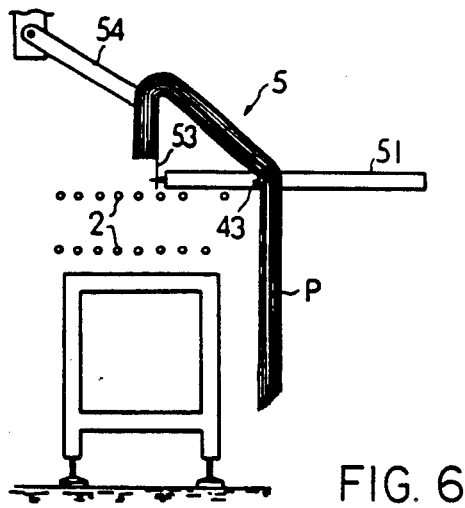
FIGS. 6 and 7 are end elevational views of the apparatus of FIG. 1 as viewed from the right in FIG. 1 and showing an alternate preferred embodiment of the mechanism at an unloading station in different positions of operation.
Figure 7:
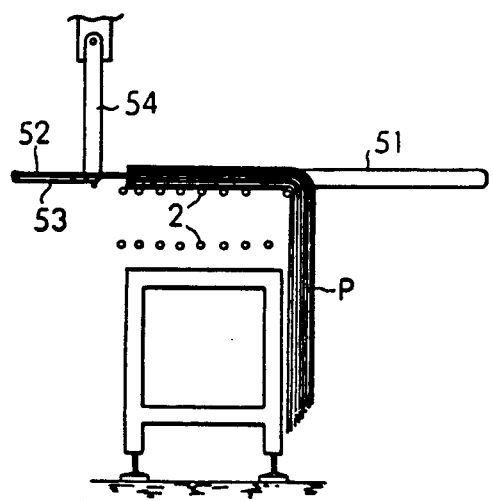
Figure 8:
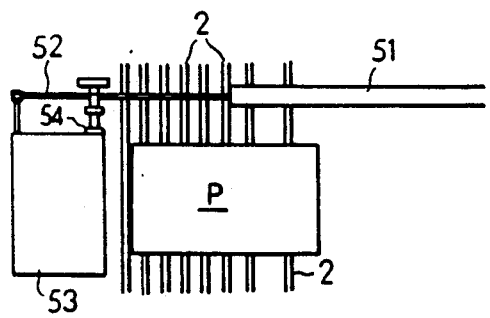
FIG. 8 is a plan view of the mechanism of FIGS. 6 and 7.

Referring to FIGS. 6–8, an alternative supporting and retaining means is provided at the loading station in the form of a mechanism 5 that includes the above described extendable and retractable rod 43 and operating piston rod 42 and cylinder 41, with the rod 43 serving to receive and support pantyhose P with the leg portions hanging freely therefrom out of contact with the conveyor belt 2. The mechanism 5 also includes a plate member 53 that is positionable in a generally upright disposition (FIG. 6) above the belt for receiving pantyhose P extending from the extendable element 43 over the upper edge of the plate 53. The plate member 53 is movable to a generally horizontal disposition (FIGS. 7 and 8) laterally beyond the belt in the direction opposite to the lateral disposition of the rod 43 and withdrawn from under the pantyhose P to place the pantyhose P onto the belt. For this purpose the upper edge of the plate 53 is pivoted to a pivot arm 54 that has one end pivoted to the upper edge of the plate member 53 and its other end mounted at a fixed pivot above the upright position of the plate member 53 and offset laterally therefrom in a direction opposite the laterally offset position of the extendable rod 43. The means for manipulating the plate member 53 is provided in the form of a generally horizontally disposed piston-cylinder mechanism having a cylinder 51 from which a piston rod 52 reciprocates generally horizontally with the other end of the piston rod 52 connected to the lower edge of the plate member 53 so that upon extension of the piston rod 52 the lower edge of the plate member 53 is manipulated in the aforementioned opposite lateral direction to move the plate member 53 with its articulation to the pivot arm 54 into a horizontal disposition. With this arrangement, pantyhose P are stacked over the upper edge of the plate member 53 and over the rod 43 with the tops of the pantyhose P hanging over the plate member 53 and the leg portions of the pantyhose P hanging freely from the rod 43. Then, upon manipulation of the plate member 53 to a horizontal disposition, the portions of the pantyhose P above the freely hanging leg portions are lowered by the plate member 53 into a horizontal disposition immediately above the conveyor belt 2 and the plate member 53 then moves laterally out from under the pantyhose P to deposit the pantyhose P on the belt 2. Simultaneously, the rod 43 is retracted to allow the leg portions of the pantyhose P to hang freely from the conveyor belt 2. Obviously, the manipulation of the plate member 53 may be obtained without the specific piston-cylinder mechanism 51, 52 but by direct manipulation through the pivot arm 54 with a suitable operating mechanism.

In operation, pantyhose P are loaded onto a platform 3 or mechanism 5 at the loading stations SC and pantyhose P are unloaded at the unloading station SD. During this simultaneous and independent loading and unloading, groups of pantyhose P are being retained at at least some of the intermediate accumulating stations SI. Those intermediate stations SI that have pantyhose groups P thereat are those closest to the unloading station SD and those that do not have pantyhose groups P thereat are those closer to the loading station SC. The platform 3 at the intermediate stations SI at which pantyhose are present, are in the raised supporting and retaining position extending above the belt 2.

When the group of pantyhose P at the unloading station SD is completely depleted by unloading, the platform 3 at the unloading station SD will be lowered, as will the platform 3 at the next adjacent intermediate station SI at one side or the other of the unloading station SD. The belt will then be advanced from the intermediate station SI to the unloading station SD to transfer the group of pantyhose P from the intermediate station SI to the unloading station SD. At the same time, all platforms 3 at the other intermediate stations on the same side of the unloading station will be lowered so that pantyhose groups P will advance from one intermediate station to the next in the direction of the unloading station. Also at the same time, all of the platforms 3 at the intermediate stations on the opposite side of the unloading station will remain raised to support pantyhose groups P out of contact with the belt so that the belt, which is moving away from the unloading station on that side of the loading station, will not transfer pantyhose P in the direction away from the loading station. When the belt 2 has advanced a distance equivalent to the space between stations, it will stop and the platforms 3 will again be raised to position pantyhose P for unloading at the unloading station and to position pantyhose groups P at the adjacent intermediate station or stations.

In operation, when loading of a complete group of pantyhose P at one of the loading stations SC has been completed, the retractable rod 43 is retracted and the platform 3 (FIGS. 1–5) for the plate member 53 (FIGS. 6–8) is lowered to place the pantyhose P on the belt 2, which is not moving at the time. The platforms 3 at the adjacent intermediate stations SI that do not have pantyhose groups P thereat are lowered below the belt and the belt is driven in the direction toward the unloading station to transfer the group of pantyhose P from the loading station SC to the empty intermediate station SI that is closest to the unloading station SD. While this is being done, the platforms 3 at all of the stations at which pantyhose P are located are in the raised position to retain the pantyhose P thereat out of transferring contact with the belt.

In the embodiment illustrated, there are two loading stations SC and one unloading station SD. Obviously, the invention could be used as well in a system in which there is one central loading station and two unloading stations at opposite ends of the belt 2. Also it is possible to adapt the invention to an apparatus having one loading station and one unloading station with the intermediate accumulating stations therebetween and with the belt controlled by advancing in only one direction.

The operation of the machine can be controlled automatically by a microprocessor or other programmable controller set to transfer pantyhose groups P upon a predetermined number of pantyhose being loaded to form a group at the loading station. The controller can be set so that upon loading of a predetermined number of units less than the number of units to form the group a selection is made automatically of the empty intermediate accumulating station that is farthest from the loading station in the direction of the unloading station. The loaded group of pantyhose is then transferred to the selected intermediate accumulating station. Similarly, prior to the unloading of all of the pantyhose at the unloading station, the controller can be set to select an adjacent intermediate accumulating station at which a group of pantyhose are located, and upon depletion of all the pantyhose at the unloading station, the controller can actuate the apparatus to transfer the group of pantyhose P from the selected intermediate accumulating station SI to the unloading station SD.

With the present apparatus, loading and unloading of pantyhose P can be performed simultaneously and loading or unloading can continue at the respective stations while pantyhose are being transferred from one loading station or to the unloading station. It is also possible to perform the transfer from the loading station to an intermediate accumulating station simultaneously with the transfer from an intermediate accumulating station on the same side of the unloading station to the unloading station. To optimize continuous production, the advancing of pantyhose groups to the unloading station is given precedence over the advancing of pantyhose groups from the loading station, but, as mentioned above, both can proceed simultaneously except where a pantyhose group is being advanced to the unloading station from one side at the time the loading of a complete group is finished at the loading station on the other side of the unloading station.

Figure 9:
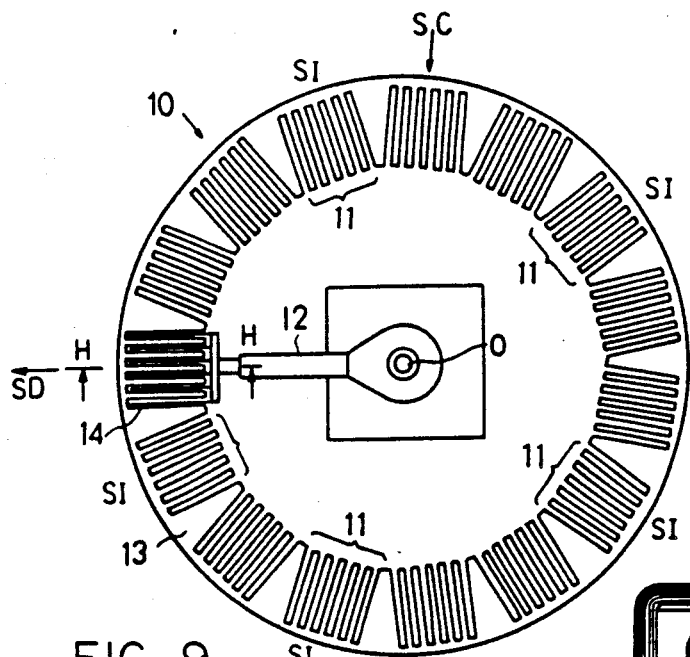
FIG. 9 is a schematic plan view of a second preferred embodiment of the apparatus of the present invention.
Figure 10:
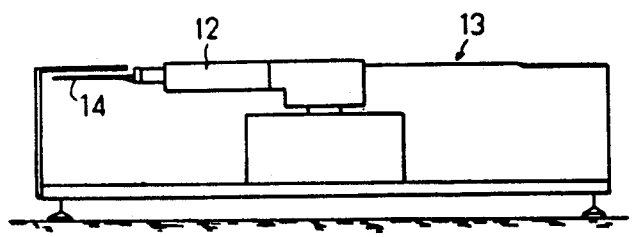
FIG. 10 is an elevational view of the apparatus of FIG. 9.
Figure 11:
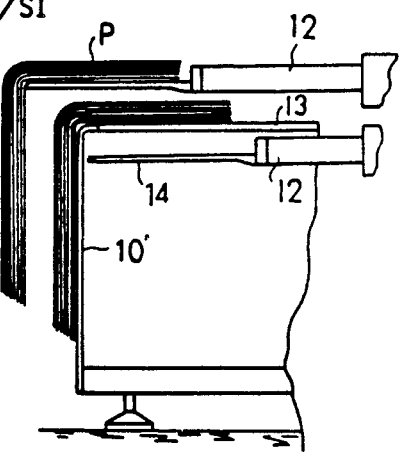
FIG. 11 is a vertical sectional view taken along line H—H of FIG. 9 illustrating the advancing means in positions before and after engaging and supporting articles.

Another preferred embodiment of the present invention is illustrated in FIGS. 9-11 where the apparatus 10 includes an article supporting table 13 having loading stations SC, an unloading station SD and intermediate accumulating stations SI. In the embodiment illustrated, the table 13 is in an annular shape having an inner circular edge being formed at each station with a plurality of parallel spaced elements 11 extending laterally at the inner edge.

In this embodiment, the means for advancing the groups of pantyhose includes a generally horzontally extending arm 12 in the form of a piston-cylinder mechanism, from which arm a plurality of parallel spaced strips extend for movement into alignment with the spaces between the spaced elements 11 from a retracted position below the table 13, upperwardly through the spaces at a station to a raised position. The retracted and raised positions of the pivot arm 12 are illustrated in FIG. 11, which also illustrates that the arm 12 is movable radially to move the strips 14 laterally at least partially beyond the opposite edge of the table 13 so that pantyhose originally supported on the table 13 with leg portions hanging from the outer edge of the table 13 will be raised by the support arm and then extended outwardly sufficiently for hanging of the leg portions from the strips 14 out of contact with the table 13. The support arm is rotatable by operation of a mechanism centrally located with respect to the table 13 for rotation of the arm 12 about an axix 0 centrally of the table. This rotation results in advancing of the pantyhose from station to station. When the arm 12 arrives at the station to which the pantyhose are being advanced, the arm 12 first retracts radially and then moves vertically downwardly through the spaces between the elements 11 to deposit the group of pantyhose P on the table 13 at the station.

In operation of this embodiment, a controller or other microprocessor is automatically informed of the station from which pantyhose are to be advanced and it activates rotation of the arm 12 to the position of that station, at which the arm is manipulated as described above to raise the group of pantyhose and advance it to the unloading station or the next intermediate station, at which the pivoted arm retracts and moves vertically downwardly through the spaces in the table 13. In this embodiment, the table 13 is supported on side walls 10' as seen in FIG. 11. If desired, the arm 12 may be provided with gripping means of any known type to retain a group of pantyhose thereon during the advancing operation.

Figure 12:
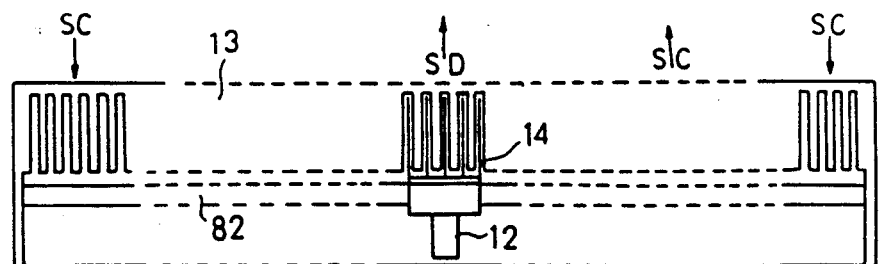
FIG. 12 is a schematic plan view of a modification of the embodiment of the apparatus of FIGS. 9-11.

A modification of the embodiment of FIGS. 9-11 is illustrated in FIG. 12, wherein the table 13 extends linearly rather than being annular. In this form, the stations are in general linear alignment and the spaced elements at the stations are at one edge of the table 13. The operating arm in this embodiment is not rotatable, but rather moves linearly from station to station along a track 82 parallel to the linear extent of the table 13. Otherwise, the arm 12 operates in the same manner as the arm 12 of the embodiment of FIGS. 9-11 in advancing pantyhose from station to station with the leg portions of the pantyhose being positioned out of contact with the table 13 during such advancing.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method of automatically transferring and accumulating groups of flaccid articles such as pantyhose or other hosiery or similar articles between loading and unloading stations and to and from intermediate accumulating stations and wherein there is a pair of said loading stations and one unloading station between said loading stations, comprising:

loading articles at a loading station to provide a group of articles thereat;

unloading articles at an unloading station independent of said loading;

upon completion of loading a group of articles at a loading station, advancing the group of articles from the loading station toward an unloading station to an intermediate accumulating station having no group of articles thereat while retaining any particles that are at an unloading station and retaining any group of articles that are at other intermediate accumulating stations;

during each of said advancings all groups of articles of intermediate accumulating stations on the opposite side of said unloading station are retained at their respective station; and upon unloading of all articles at an unloaded station, advancing a group of articles from an intermediate accumulating station to the unloading station.

2. A method of automatically transferring and accumulating groups of flaccid articles such as pantyhose or other hosiery or similar articles between loading and unloding stations and to and from intermediate accumulating stations and wherein there is a pair of said unloading stations and one loading station between said unloading stations, comprising:
- loading articles at a loading station to provide a group of articles thereat;
- unloading articles at an unloading station independent of said loading;
- upon completion of loading a group of articles at a loading station, advancing the group of articles from the loading station toward an unloading station to an intermediate accumulating station having no group of articles thereat while retaining any articles that are at an unloading station and retaining any group of articles that are at other intermediate accumulating stations;
- during each of said advancings all groups of articles at intermediate accumulating stations on the opposite side of said loading station are retained at their respective station; and
- upon unloading of all articles at an unloading station, advancing a group of articles from an intermediate accumulating station to the unloading station.

3. A method of automatically transferring and accumulating groups of flaccid articles according to claim 1 or 2 and characterized further by advancing a group of articles from one intermediate accumulating station to another intermediate accumulating station more proximate an unloading station.

4. A method of automatically transferring and accumulating groups of flaccid articles according to claim 3 and characterized further in that said advancing from one intermediate accumulating station to another is performed during at least one of said advancing from a loading station and said advancing to an unloading station.

5. A method of automatically transferring and accumulating groups of flaccid articles according to claim 1 and wherein an endless conveyor belt extends between all stations and characterized further in that each of said advancings is performed by placing said groups of articles on said conveyor belt and moving said conveyor belt in the direction of advancing.

6. A method of automatically transferring and accumulating groups of flaccid articles according to claim 2 and wherein an endless conveyor belt extends between all stations and characterized further in that each of said advancings is performed by placing said groups of articles on said conveyor belt and moving said conveyor belt in the direction of advancing.

7. Apparatus for automatically transferring and accumulating groups of flaccid articles such as pantyhose or other hosiery or similar articles comprising:
- a pair of loading stations at which articles are loaded to provide a group of articles thereat;
- one unloading station between said loading stations at which articles are unloaded independent of loading at said loading station;
- intermediate accumulating stations between said loading and unloading stations;
- means for advancing groups of articles from said loading station to intermediate accumulating stations having no articles thereat, from an intermediate accumulating station to another intermediate accumulating station having no articles thereat, and from an intermediate accumulating station to said unloading station;
- means at each said loading, unloading and intermediate accumulating station for selectively supporting and retaining articles thereat during operation of said advancing means to advance other groups of articles from other of said loading and intermediate accumulating stations; and
- said supporting and retaining means being operable to retain articles at intermediate accumulating stations on one side of said unloading station while said advancing means is advancing articles on the other side of said unloading station.

8. Apparatus for automatically transferring and accumulating groups of flaccid articles such as pantyhose or other hosiery or similar articles comprising:
- a loading station at which articles ae loaded to provide a group of articles thereat;
- a pair of unloading stations at which articles are unloaded independent of loading at said loading station, said loading station being between said unloading stations;
- intermediate accumulating stations between said loading and unloading stations;
- means for advancing groups of articles from said loading station to intermediate accumulating stations having no articles thereat, from an intermediate accumulating station to another intermediate accumulating station having no articles thereat, and from an intermediate accumulating station to said unloading station;
- means at each said loading, unloading and intermediate accumulating station for selectively supporting and retaining articles thereat during operation of said advancing means to advance other groups of articles from other of said loading and intermediate accumulating stations; and
- said supporting and retaining means being operable to retain articles at intermediate accumulating stations on one side of said loading station while said advancing means is advancing articles on the other side of said loading station.

9. Apparatus for automatically transferring and accumulating groups of flaccid articles according to claim 7 or 8 and characterized further in that said advancing means is operable to advance a group of articles from one intermediate accumulating station to another intermediate accumulating station more proximate an unloading station.

10. Apparatus for automatically transferring and accumulating groups of flaccid articles according to claim 7 or 8 and characterized further in that said stations are equally spaced and said advancing means is operable to advance groups of articles to at least two stations simultaneously.

11. Apparatus for automatically transferring and accumulating groups of flaccid articles according to claim 7 and characterized further in that in that said advancing means includes an endless conveyor belt extending between all said stations for transferring groups of articles thereon, said belt being movable in opposite directions for advancing article groups toward said unloading station from either direction.

12. Apparatus for automatically transferring and accumulating groups of flaccid articles according to claim 8 and characterized further in that in that said advancing means includes an endless conveyor belt extending between all said stations for transferring groups of articles thereon, said belt being movable in opposite directions for advancing article groups toward said unloading stations in either direction.

13. Apparatus for automatically transferring and accumulating groups of flaccid articles such as pantyhose or other hosiery or similar articles comprising:
- a loading station at which articles are loaded to provide a group of articles thereat;
- an unloading station at which articles are unloaded independent of loading at said loading station,
- intermediate accumulating stations between said loading and unloading stations;
- means for advancing groups of articles from said loading station to intermediate accumulating stations having no articles thereat, from an intermediate accumulating station to another intermediate accumulating station having no articles thereat, and from an intermediate accumulating station to said unloading station;
- means at each said loading, unloading and intermediate accumulating station for selectively supporting and retaining articles thereat during operation of said advancing means to advance other groups of articles from other of said loading and intermediate accumulating stations; and
- said supporting and retaining means at said loading station comprises an element extendable to a position laterally offset from and above said advancing means to receive and support articles with portions hanging freely therefrom out of contact with said advancing means, and a plate member positionable in a generally upright position above said advancing means for receiving articles extending from said extendable element over said plate member, said element being retractable and said plate member being movable to a generally horizontal disposition laterally beyond said advancing means in the direction opposite the lateral disposition of said element and withdrawing from under said articles to place said articles onto said advancing means with said portions hanging freely therefrom.

14. Apparatus for automatically transferring and accumulating groups of flaccid articles according to claim 13 and characterized further in that said plate member has an upper edge and a lower edge in its generally upright position, a pivot arm having one end pivoted to said upper edge of said plate member and its other end mounted at a fixed pivot above the upright position of said plate member and offset laterally therefrom in a direction opposite the laterally offset position of said extendable element, and means for manipulating said plate member to move its lower edge in said opposite lateral direction to cause pivoting of said upper edge downwardly to dispose said plate member generally horizontal for horizontal support of said articles and to move laterally from under said articles for placement of said articles onto said advancing means.

15. Apparatus for automatically transferring and accumulating groups of flaccid articles according to claim 14 and characterized further in that said manipulating means includes a generally horizontally disposed piston-cylinder mechanism having the outer end of the piston rod thereof connected to said lower edge of said plate member and extendable to move said lower edge in said opposite lateral direction.

* * * * *

UNITED STATES PATENT AND TRADEMARK OFFICE
CERTIFICATE OF CORRECTION

PATENT NO. : 4,953,687

DATED : September 4, 1990

INVENTOR(S) : Vinicio Gazzarrini

It is certified that error appears in the above-identified patent and that said Letters Patent is hereby corrected as shown below:

Column 1, Line 17, reads "of" (second occurrence) but should read -- or --.

Column 1, Line 54, reads "storage" but should read -- stoppage --.

Column 1, Line 57, reads "number" but should read -- numbers --.

Column 1, Line 61, reads "of" (second occurrence) but should read -- or --.

Column 2, Line 3, reads "group" but should read -- groups --.

Column 2, Line 58, reads "staton" but should read -- station --.

Column 3, Line 19, reads "station" but should read -- stations --.

Column 4, Line 20, after "embodiment" delete -- for --.

Column 5, Line 29, reads "side-elevational" but should read -- side elevational --.

Column 5, Line 63, reads "articles" but should read -- article --.

Column 6, Line 57, reads "srip" but should read -- strip --.

Column 7, Line 29, reads "other" but should read -- outer --.

Column 7, Line 64, reads "platform" but should read -- platforms --.

Column 7, Line 65, after "present" delete -- , --.

Column 8, Line 50, reads "by" but should read -- for --.

UNITED STATES PATENT AND TRADEMARK OFFICE
CERTIFICATE OF CORRECTION

PATENT NO. : 4,953,687

DATED : September 4, 1990

INVENTOR(S) : Vinicio Gazzarrini

It is certified that error appears in the above-identified patent and that said Letters Patent is hereby corrected as shown below:

Column 8, Line 66, reads "are" but should read -- is --.

Column 9, Line 31, reads "horzontally" but should read -- horizontally --.

Column 9, Line 36, reads "upperwardly" but should read -- upwardly --.

Column 9, Line 49, reads "axix" but should read -- axis --.

Column 10, Line 54, reads "particles" but should read -- articles --.

Column 10, Line 61, reads "unloaded" but should read -- unloading --.

Column 10, Line 67, reads "unloding" but should read -- unloading --.

Column 12, Line 12, reads "ae" but should read -- are --.

Column 12, Line 55, after "in that" delete -- in that --.

Column 12, Line 63, after "in that" delete -- in that --.

Column 13, Line 7, reads "," but should read -- ; --.

Signed and Sealed this

Twenty-seventh Day of October, 1992

Attest:

DOUGLAS B. COMER

*Attesting Officer*     *Acting Commissioner of Patents and Trademarks*